(12) United States Patent
Shen

(10) Patent No.: US 6,880,420 B2
(45) Date of Patent: Apr. 19, 2005

(54) AUTOMATIC CONTROL DEVICE FOR A MOTORIZED VEHICLE GEARBOX

(76) Inventor: Yen-Hsing Shen, No. 54, Lane 134, Tung An Road, Tainan City (TW)

( * ) Notice: Subject to any disclaimer, the term of this patent is extended or adjusted under 35 U.S.C. 154(b) by 28 days.

(21) Appl. No.: 10/646,910

(22) Filed: Aug. 22, 2003

(65) Prior Publication Data
US 2005/0039558 A1 Feb. 24, 2005

(51) Int. Cl.[7] .................. F16H 59/00; F16H 61/00; F16H 63/00; F16H 3/14
(52) U.S. Cl. ................ 74/335; 74/337.5; 74/355
(58) Field of Search ............... 74/335, 337.5, 74/339, 355, 361, 371, 376

(56) References Cited
U.S. PATENT DOCUMENTS 6,230,862 B1 * 5/2001 Reik et al. ............... 192/3.56
6,439,362 B1 * 8/2002 Reik et al. ............... 192/3.56
6,457,374 B1 * 10/2002 Shen ......................... 74/335
2002/0189382 A1 * 12/2002 Su ............................ 74/337.5

* cited by examiner

Primary Examiner—Tisha Lewis
(74) Attorney, Agent, or Firm—Charles E. Baxley

(57) ABSTRACT

An automatic control device is provided for a gearbox of a motorized vehicle. The motorized vehicle gearbox includes a movable block movable between a forward driving position, a neutral position, and a reverse driving position. The automatic control device includes a motor, a transmission gear driven by the motor and including an eccentric axle provided thereon, a connecting rod having an end rotatably connected to the eccentric axle, an eccentric block including an end rotatably connected to the other end of the connecting rod, and an actuating device including a first end securely connected to the other end of the eccentric block and a second end securely engaged with the movable block to move therewith. When the motor is activated, the transmission gear is driven to move the movable block to one of the forward driving position, the neutral position, and the rearward driving position.

20 Claims, 18 Drawing Sheets

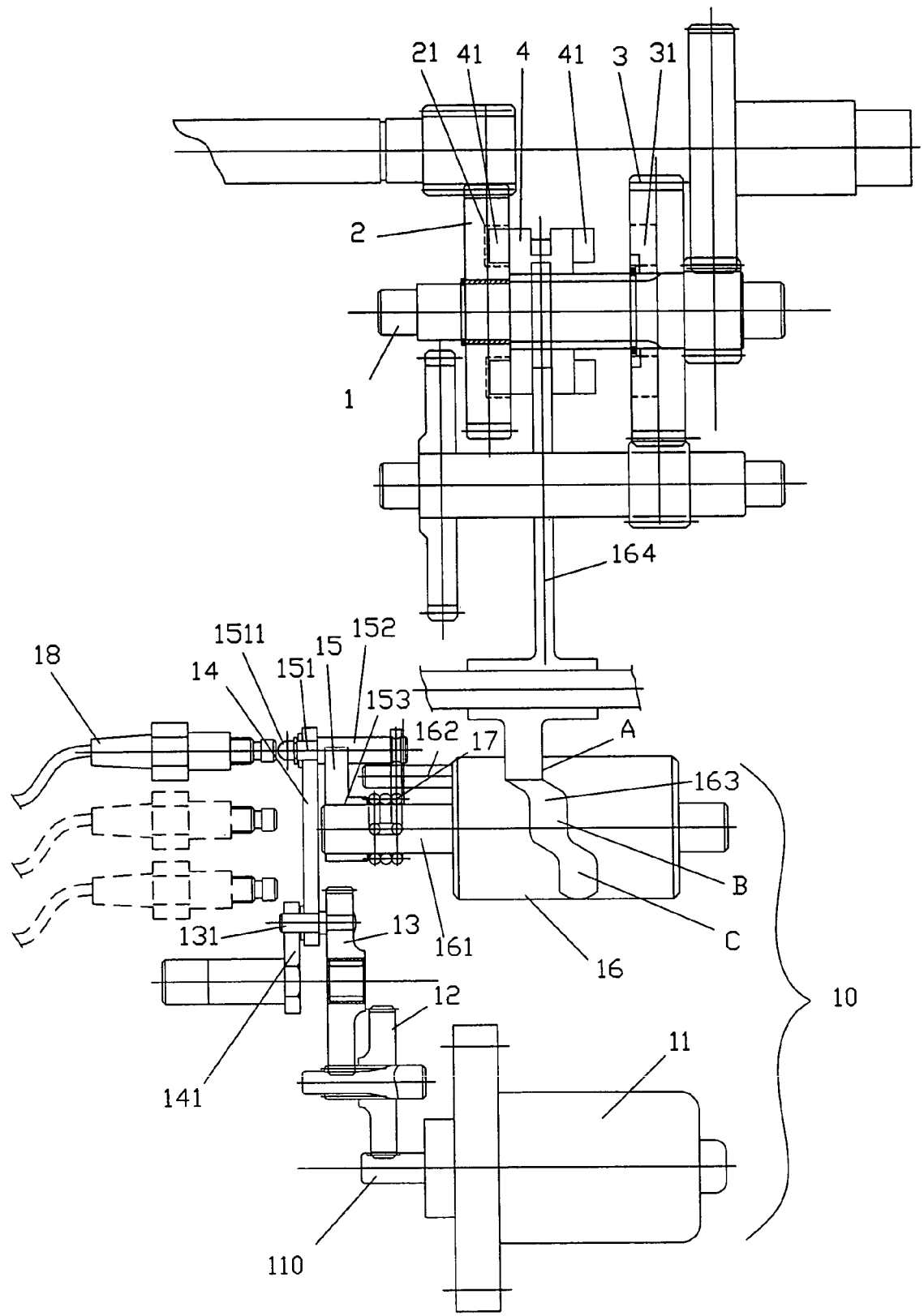
F I G . 1

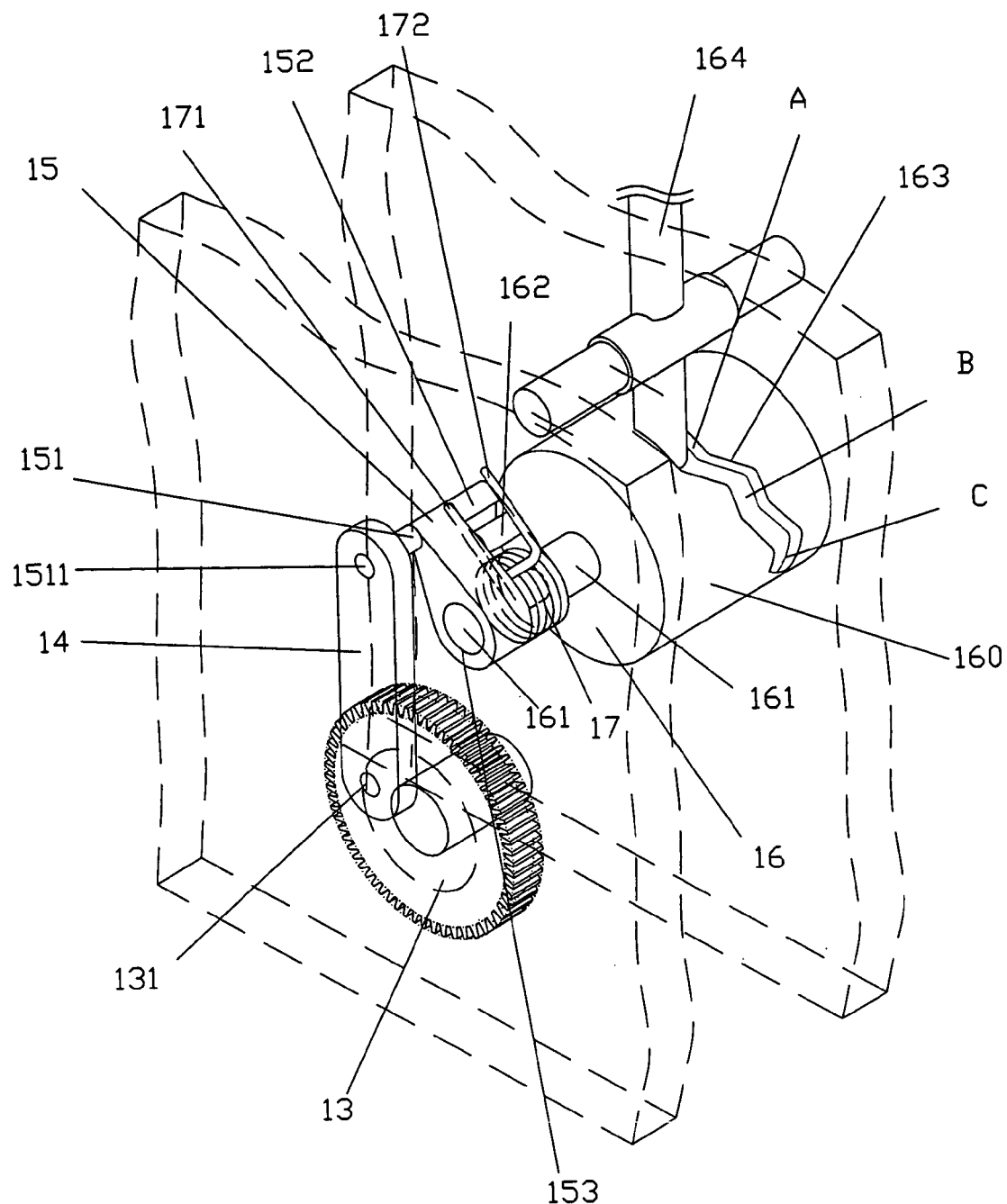
F I G . 3

AUTOMATIC CONTROL DEVICE FOR A MOTORIZED VEHICLE GEARBOX

BACKGROUND OF THE INVENTION

1. Field of the Invention

The present invention relates to an automatic control device for a motorized vehicle gearbox.

2. Description of the Related Art

A typical two-wheeled motorized vehicle cannot move backwards. Nevertheless, a beach motorcycle must have this function to avoid getting stuck when desired.

FIG. 15 of the drawings illustrates a conventional motorized vehicle gearbox with a control mechanism for controlling forward/backward movement. FIG. 16 is a perspective view of main parts of the gearbox in FIG. 15. The gearbox includes a transmission shaft 4', a first gear 1' mounted on the transmission shaft 4' via a bearing 11' for forward driving, a second gear 2' mounted on the transmission shaft 4' via a bearing 21' for rearward driving, a first follower shaft 6', and a second follower shaft 7'. A movable block 3' is mounted on the transmission shaft 4' to move therewith. Further, the movable block 3' is slidable along a longitudinal direction of the transmission shaft 4'. The movable block 3' includes two protrusions 31' respectively on two sides thereof for respectively and releasably engaging with one of an engaging groove 12' defined in a side of the first gear 1' and an engaging groove 22' defined in a side of the second gear 2'. The movable block 3' is connected to an actuating rod 5' to move therewith.

When the actuating rod 5' is shifted to move the movable block 3' to a position in which one of the protrusions 31' is engaged in the engaging groove 12' of the first gear 1' or the engaging groove 22' of the second gear 2', one of the first shaft 6' and the second shaft 7' is turned, thereby driving the motorized vehicle forward or backward. However, operation of the actuating rod 5' is required.

FIG. 17 of the drawings illustrates a motorized vehicle gearbox with another conventional control mechanism for controlling forward/backward movement. FIG. 18 is a perspective view of main parts of the gearbox in FIG. 17. To solve the inconvenience of operation of the actuating rod, the control mechanism in FIG. 17 comprises an automatic control device 8' including a motor 81', a reduction gear 82', and a screw 83' that meshes with the actuating rod 50'. Thus, the motor 81' can be activated to move the actuating rod 50' via transmission by the reduction gear 82' and the screw 83'. Nevertheless, the motor 81' must be activated to turn in a reverse direction for moving the actuating rod 50' in a reverse direction, which causes inconvenient control movement. Further, the travel "X" (FIG. 17) of the first gear 1' to the second gear 2' (or vice versa) is fixed, yet the travel of the actuating rod 50' on the screw 83' is not fixed. As a result, the movable block 3' might impinge the first gear 1' and/or the second gear 2'.

Further, the protrusion 31' of the movable block 3' may not be exactly aligned with, e.g., the engaging groove 12' of the first gear 1' (FIG. 18) during rotation of the movable block 3'. Namely, the movable block 3' has to turn through a small angle to allow insertion of the protrusion 31' into the engaging groove 12'. Transmission of the control device is not reliable. Further, damage to the parts of the control mechanism resulting from impingement occurs, as no buffering means is provided.

SUMMARY OF THE INVENTION

An object of the present invention is to provide an automatic control device for a gearbox of a motorized vehicle. The motorized vehicle gearbox includes a movable block movable between a forward driving position for driving the motorized vehicle forward, a neutral position, and a reverse driving position for driving the motorized vehicle rearward.

The automatic control device includes a motor, a transmission gear driven by the motor and including an eccentric axle provided thereon, a connecting rod having a first end rotatably connected to the eccentric axle and a second end, an eccentric block including a first end rotatably connected to the second end of the connecting rod and a second end, and an actuating device including a first end securely connected to the second end of the eccentric block and a second end securely engaged with the movable block to move therewith.

When the motor is activated, the transmission gear is driven to move the movable block via transmission by the eccentric axle, the connecting rod, the eccentric block, and the actuating device, thereby moving the movable block to one of the forward driving position, the neutral position, and the rearward driving position.

In an embodiment of the invention, the actuating device includes an actuating wheel having a longitudinal axle extending therefrom. The longitudinal axle of the actuating wheel is securely connected to the second end of the eccentric block. A positioning groove is defined in a periphery of the actuating wheel and includes three positioning sections respectively corresponding to the forward driving position, the neutral position, and the rearward driving position of the movable block. An actuating rod includes a first end slidably guided in the positioning groove and movable between the three positioning sections. The actuating rod further includes a second end connected to the movable block to move therewith. The motor turns in the same direction to drive the actuating wheel in a first direction and then in a second direction opposite to the first direction.

In another embodiment of the invention, the actuating device includes a rod having a first end and a second end. An axle is formed on the first end of the rod and securely connected to the second end of the eccentric block. The second end of the rod is connected to the movable block to move therewith. The motor turns in the same direction to drive the rod in a first direction and then in a second direction opposite to the first direction.

An elastic element is provided for absorbing additional travel of the motor in a case that the movable block is in one of the forward driving position and the rearward driving position and that a protrusion of the movable block 4 is not aligned with an engaging groove of an associated one of a first gear and a second gear of the gearbox.

A sensor may be mounted on the eccentric block and a sensing device may be provided for detecting an angular position of the eccentric block by means of detecting a position of the sensor. The sensing device stops the motor based on detected angular position of the eccentric block, thereby positioning the movable block in one of the forward driving position, the neutral position, and the rearward driving position.

Other objects, advantages, and novel features of the invention will become more apparent from the following detailed description when taken in conjunction with the accompanying drawings.

BRIEF DESCRIPTION OF THE DRAWINGS

FIG. 1 is a plan view of a motorized vehicle gearbox with an automatic control device for in accordance with the present invention.

FIG. 3 is a perspective view of the automatic control device in accordance with the present invention.

DETAILED DESCRIPTION OF THE PREFERRED EMBODIMENTS

Figure 2:
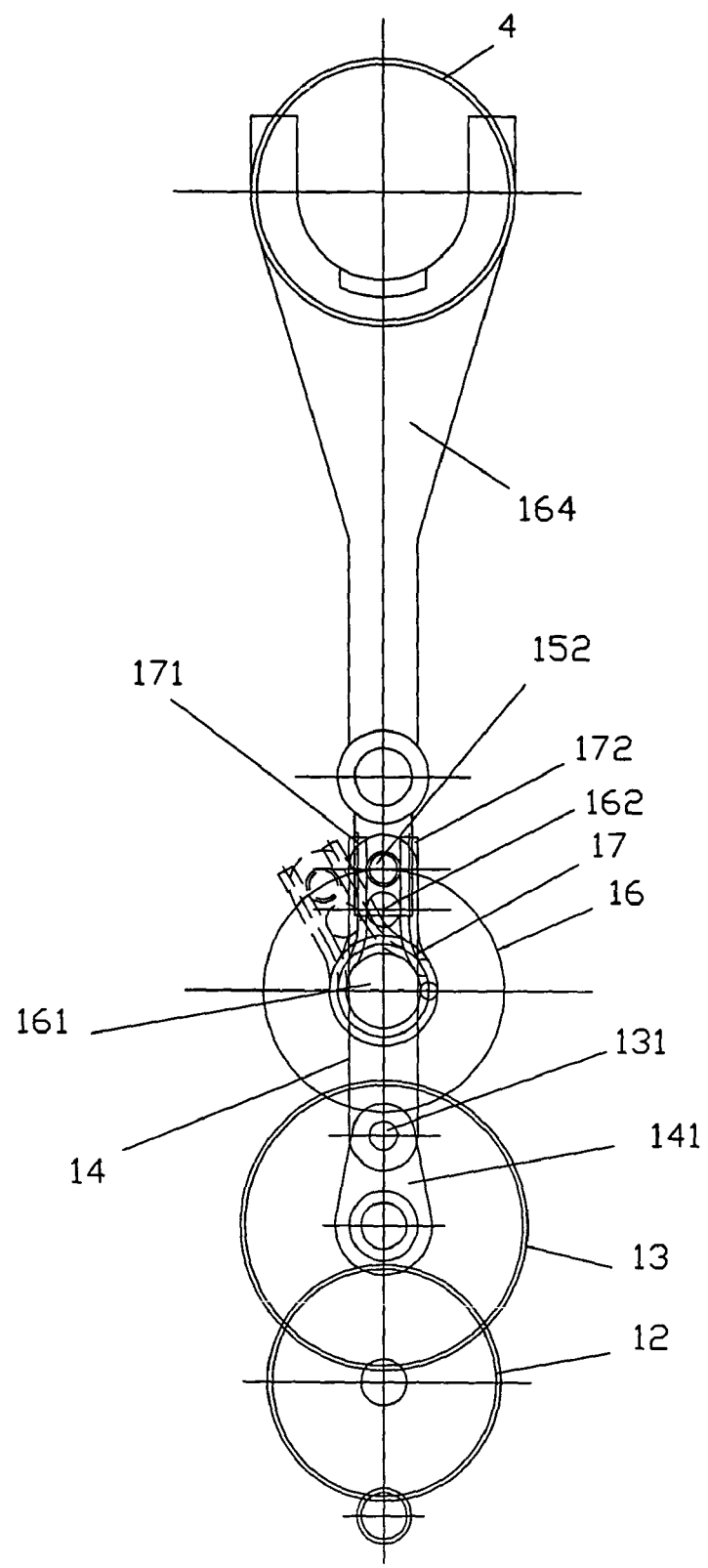
FIG. 2 is a side view of the gearbox in FIG. 1.

Referring to FIGS. 1 through 3, an automatic control device in accordance with the present invention is designated by 10 and designed for use with a motorized vehicle gearbox. The gearbox includes a transmission shaft 1, a first gear 2 mounted on the transmission shaft 1 via a bearing (not labeled) for forward driving, a second gear 3 mounted on the transmission shaft 1 via a bearing (not labeled) for rearward driving. A movable block 4 is mounted on the transmission shaft 1 to move therewith. Further, the movable block 4 is slidable along a longitudinal direction of the transmission shaft 1. The movable block 4 includes two protrusions 41 respectively on two sides thereof for respectively and releasably engaging with one of an engaging groove 21 defined in a side of the first gear 2 and an engaging groove 31 defined in a side of the second gear 3, thereby driving the motorized vehicle forward or backward.

The automatic control device 10 comprises a motor 11, a reduction gear 12, a transmission gear 13, a connecting rod 14, an eccentric block 15, an actuating device 16, an elastic element 17, and a sensing device 18. The motor 11 includes an output shaft 110 for driving the reduction gear 12 that meshes with the transmission gear 13. An eccentric axle 131 is provided on the transmission gear 13 and rotatably connected to an end of the connecting rod 14. Further, a linking rod 141 has a first end rotatably mounted to the axle 131 and a second end that has a longitudinal axis coincident with a rotating axis of the transmission gear 13. The linking rod 141 is provided for improving rotational stability.

A peg 151 is formed on an end of the eccentric block 15 and rotatably connected to the other end of the connecting rod 14. A sensor 1511 is mounted on the peg 151. Also formed on the end of the eccentric block 15 is an actuating peg 152 that is located corresponding to the elastic element 17. Formed on the other end of the eccentric block 15 is a hole 153, which will be described later.

The actuating device 16 includes a substantially cylindrical actuating wheel 160 having a longitudinal axle 161 extending therethrough. The longitudinal axle 161 is securely received in the hole 153 of the eccentric block 15. An abutting member 162 is formed on an end face of the actuating wheel 160. Further, a positioning groove 163 is defined in a periphery of the actuating wheel 160. An actuating rod 164 includes a first end slidably guided in the positioning groove 163 and a second end connected to the movable block 4 to move therewith. The positioning groove 163 includes three positioning sections "A", "B", and "C" corresponding to a forward gear position, a neutral gear position, and a reverse gear position, respectively.

The elastic element 17 is mounted around the axle 161 of the actuating device 16 and includes a first end abutting against the actuating peg 152 and a second end abutting against the abutting member 162.

The sensing device 18 controls operation of the motor 11 and is mounted adjacent to the eccentric block 15. Further, the sensing device 18 faces the forward gear position, neutral position, and reverse gear position and cooperates with the sensor 1511 on the eccentric block 15.

The motor 11 can be activated to drive the reduction gear 12 and the transmission gear 13 for moving the connecting rod 4 and the eccentric block 5. The actuating peg 152 of the eccentric block 5 presses against the first end 171 of the elastic element 17, and the second end 172 of the elastic element 17 presses against the abutting member 162 of the actuating wheel 160 of the actuating device 16, thereby driving the actuating wheel 160 to turn. Further, the actuating rod 164 slides along the positioning groove 163 for shifting the movable block 4 to a first position engaging with the first gear 2 for forward driving, a second position (neutral position), or a third position engaging with the second gear 3 for backward driving.

Figure 4:
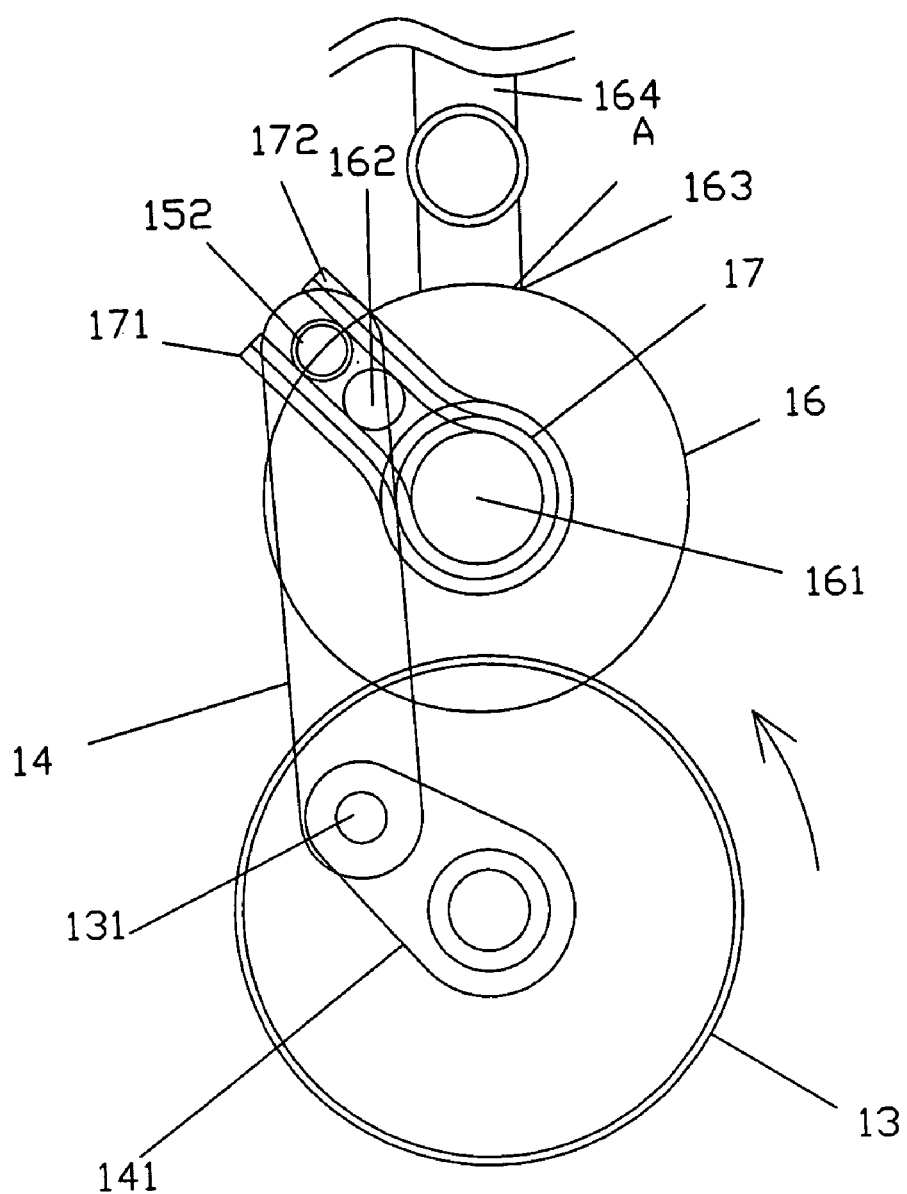
FIG. 4 is a side view, in an enlarged scale, of the automatic control device in accordance with the present invention, wherein an actuating wheel is in a forward gear position for forward driving.
Figure 5:
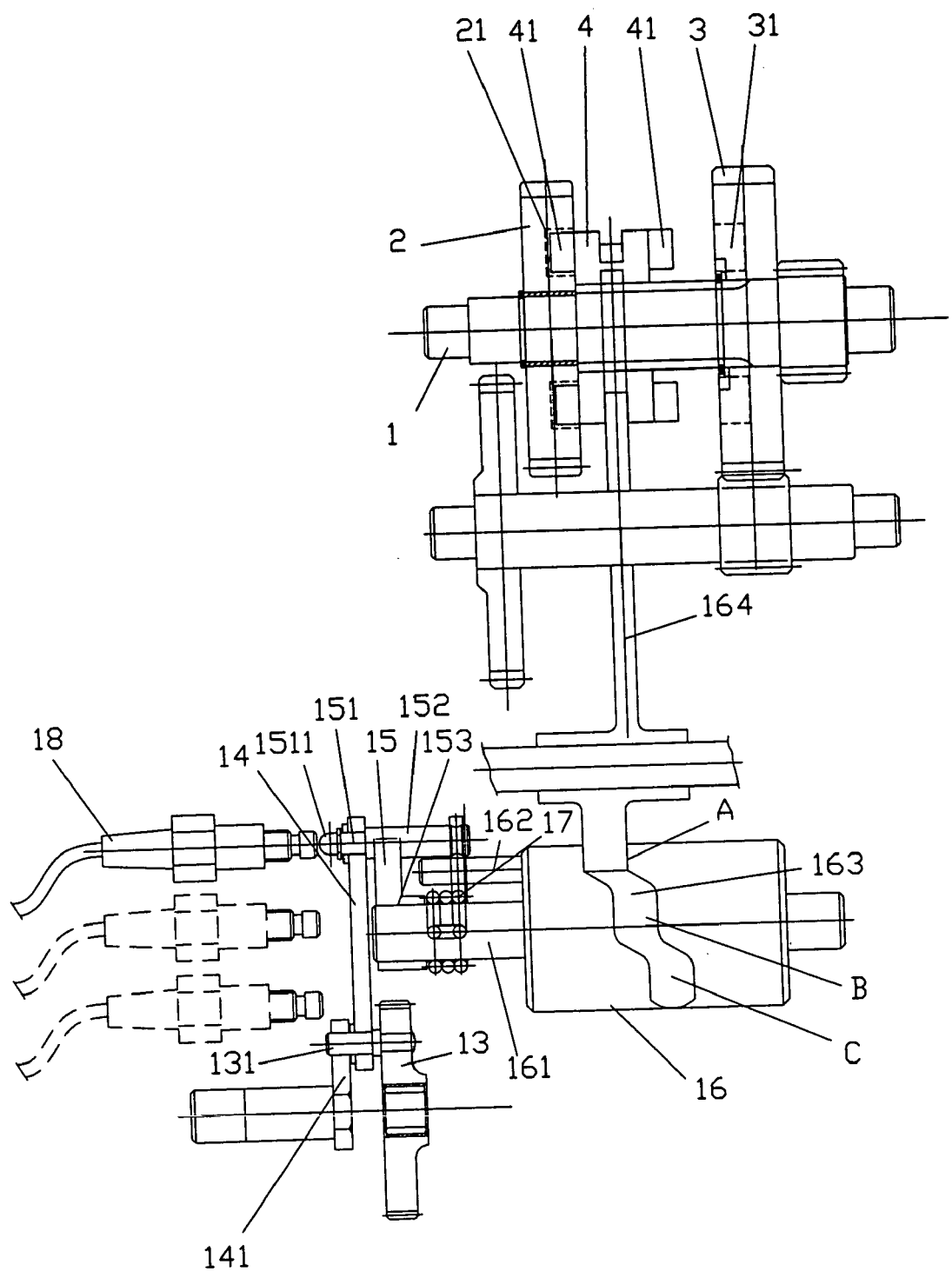
FIG. 5 is a plan view of the gearbox, wherein an actuating wheel is in a forward gear position for forward driving.

When the transmission gear 13 turns and moves the connecting rod 14 counterclockwise to a position shown in FIGS. 4 and 5, the actuating rod 164 is located in the positioning section "A" as a result of counterclockwise rotation of the actuating wheel 160. Meanwhile, the protrusion 41 of the movable block 4 is engaged with the engaging groove 21 of the first gear 2 for driving the motorized vehicle forward.

Figure 6:
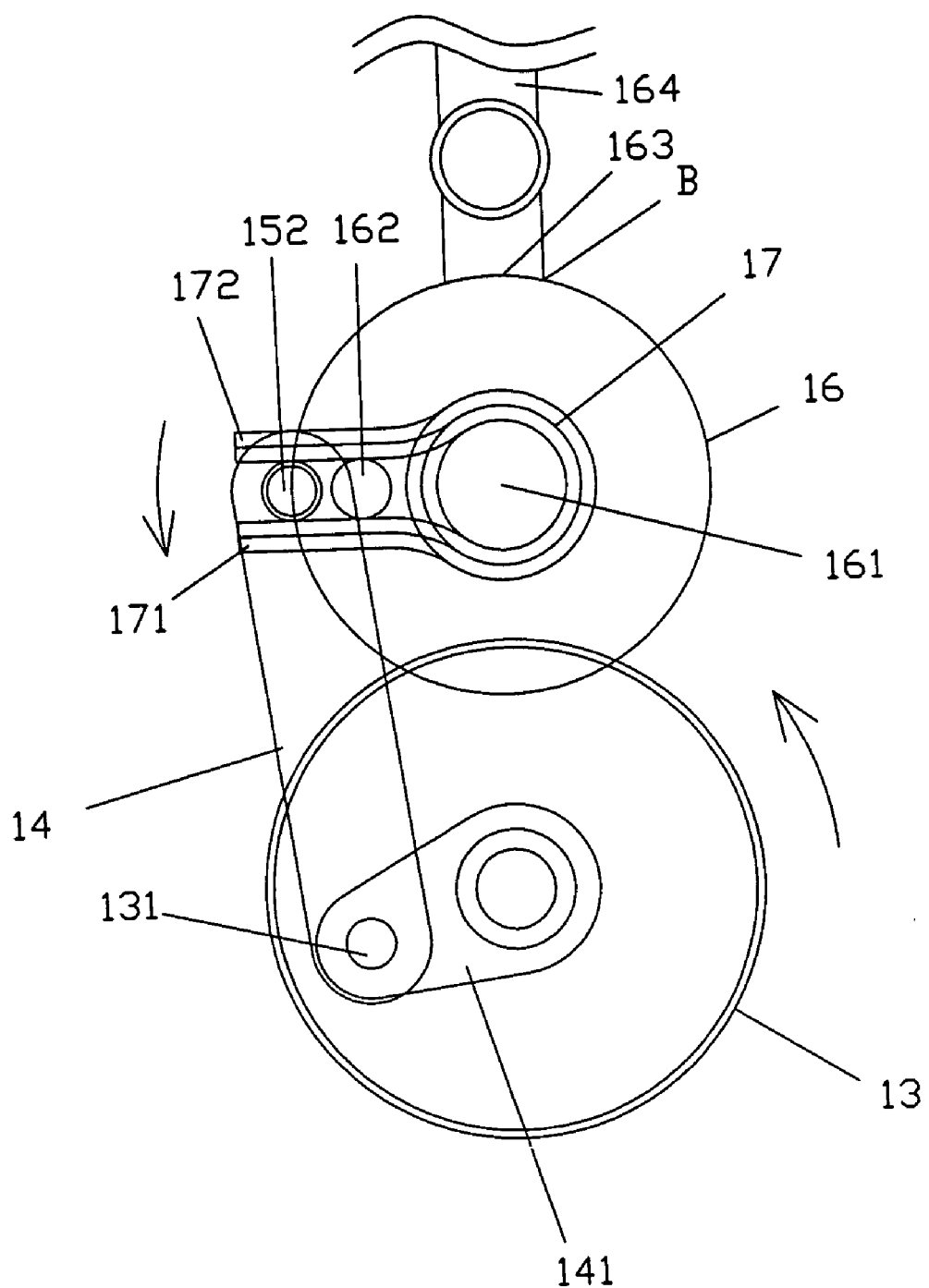
FIG. 6 is a view similar to FIG. 4, wherein the actuating wheel is in a neutral position.
Figure 7:
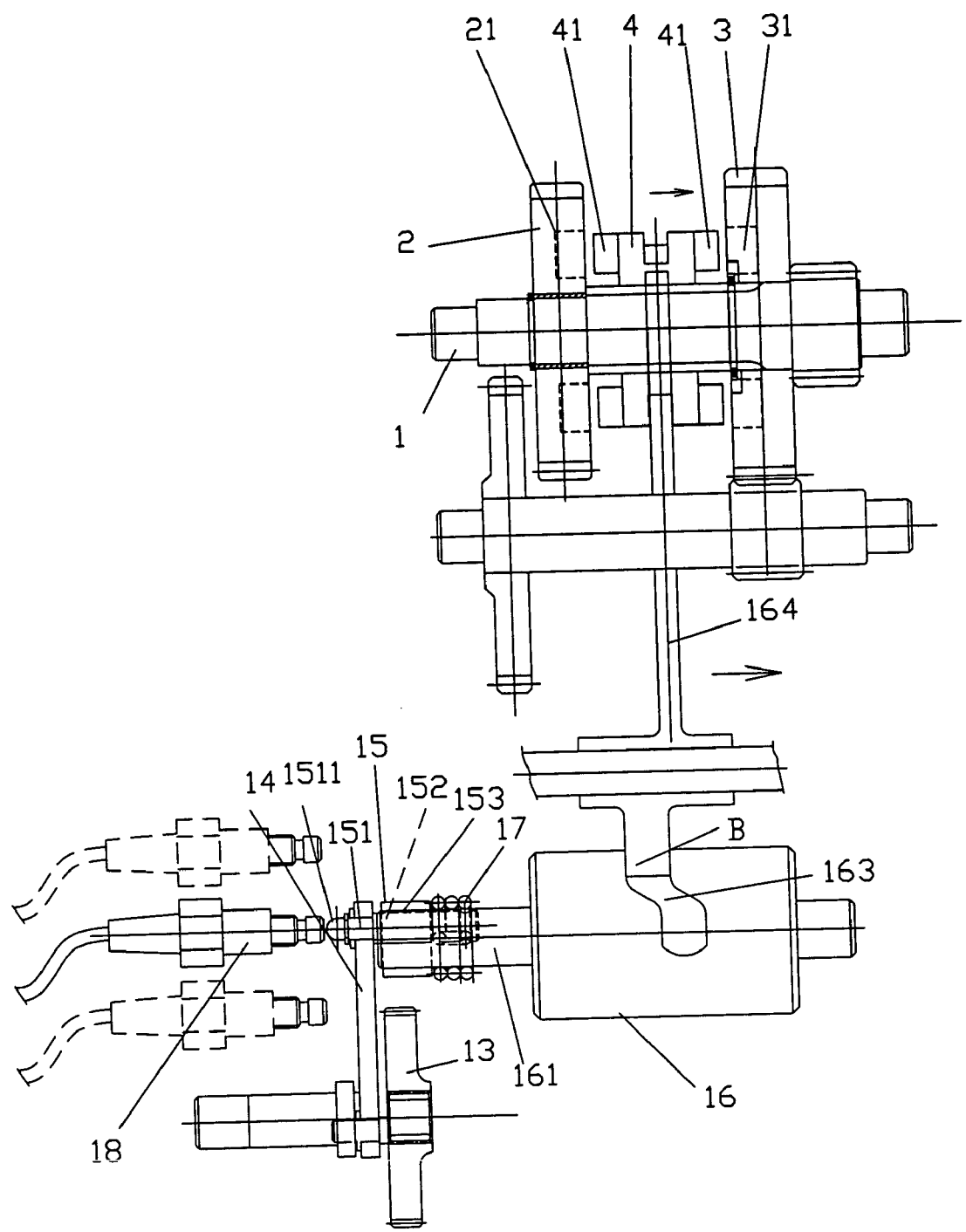
FIG. 7 is a view similar to FIG. 5, wherein the actuating wheel is in a neutral position.

When the transmission gear 13 further turns and moves the connecting rod 14 counterclockwise to a position shown in FIGS. 6 and 7, the actuating rod 164 is located in the positioning section "B" as a result of further counterclockwise rotation of the actuating wheel 160. Meanwhile, the movable block 4 is in a neutral position not engaging with any one of the first gear 2 and the second gear 3.

Figure 8:
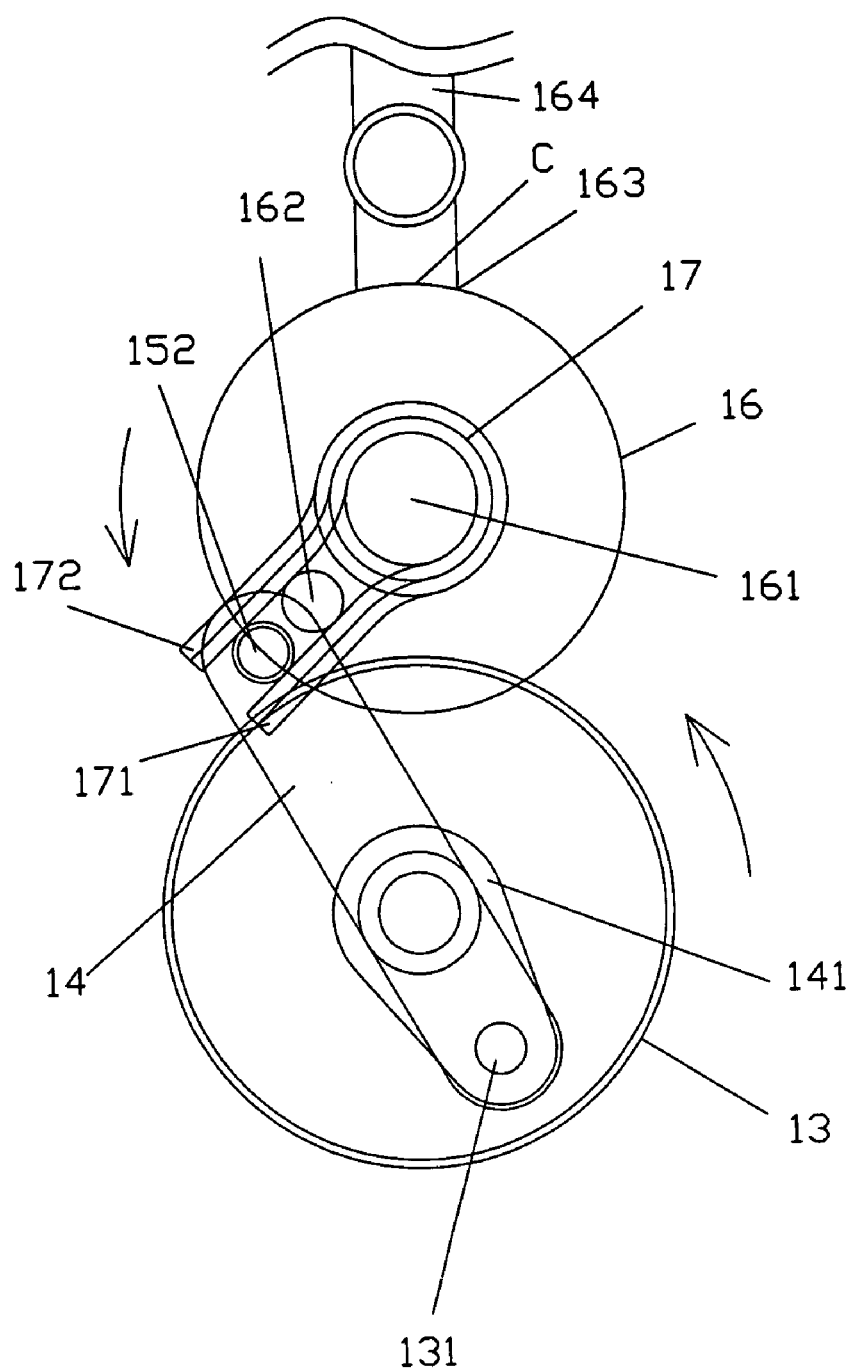
FIG. 8 is a view similar to FIG. 4, wherein the actuating wheel is in a reverse gear position.
Figure 9:
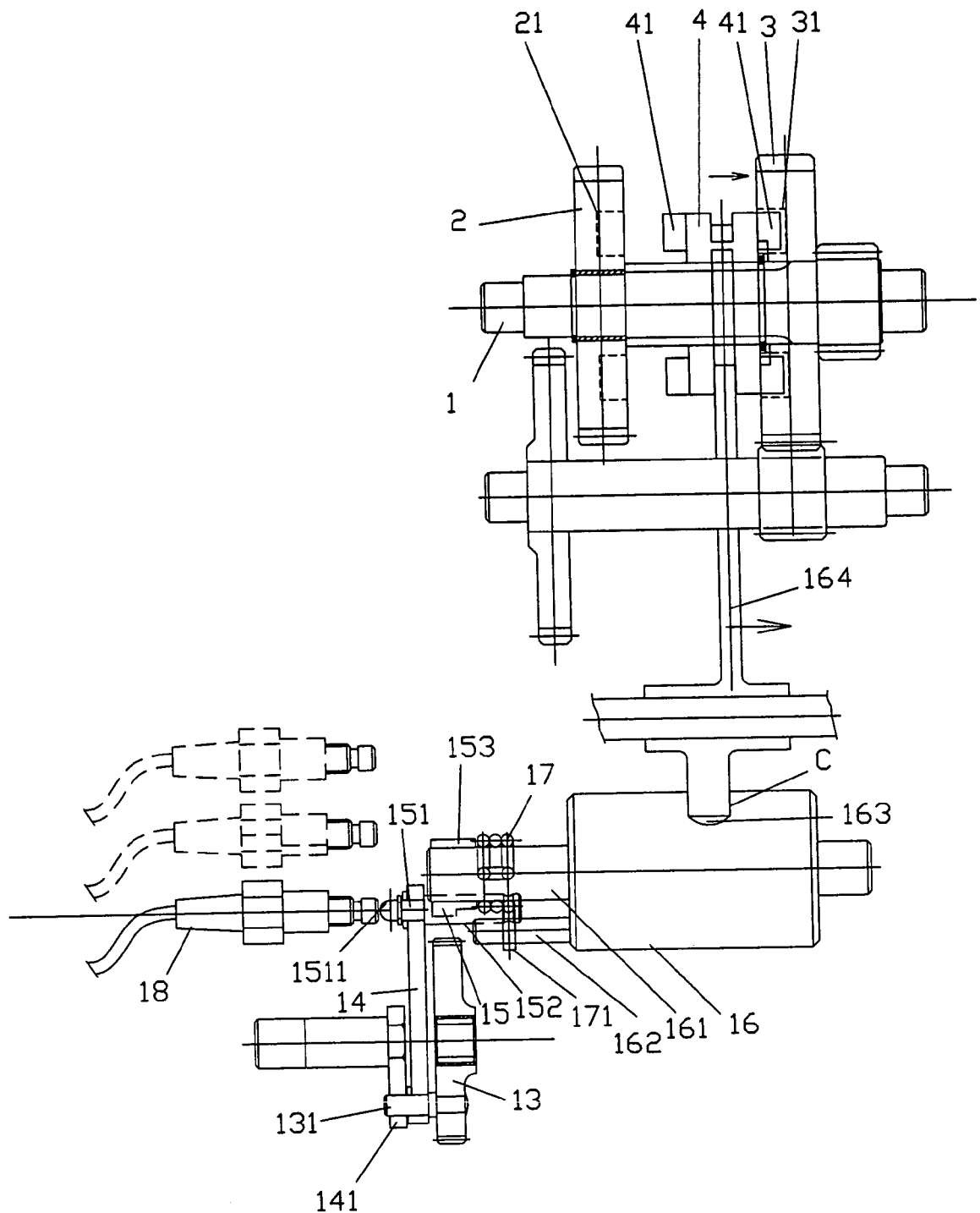
FIG. 9 is a view similar to FIG. 5, wherein the actuating wheel is in a reverse gear position.

When the transmission gear 13 further turns and moves the connecting rod 14 counterclockwise to a position shown in FIGS. 8 and 9, the actuating rod 164 is located in the positioning section "C" as a result of further counterclockwise rotation of the actuating wheel 160. Meanwhile, the other protrusion 41 of the movable block 4 is engaged with the engaging groove 31 of the second gear 3 for driving the motorized vehicle backward.

Figure 10:
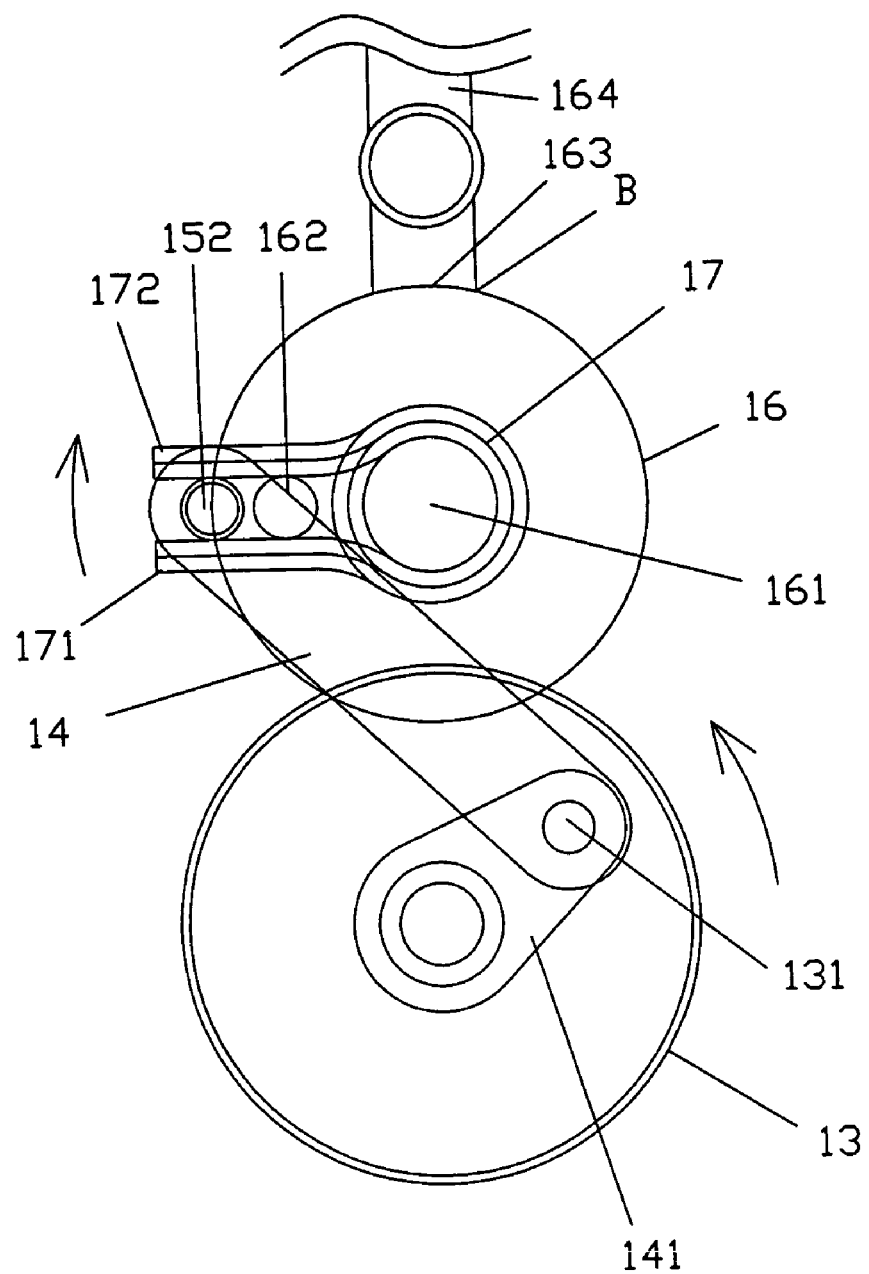
FIG. 10 is a view similar to FIG. 4, wherein the actuating wheel turns in a reverse direction to the neutral position.
Figure 11:
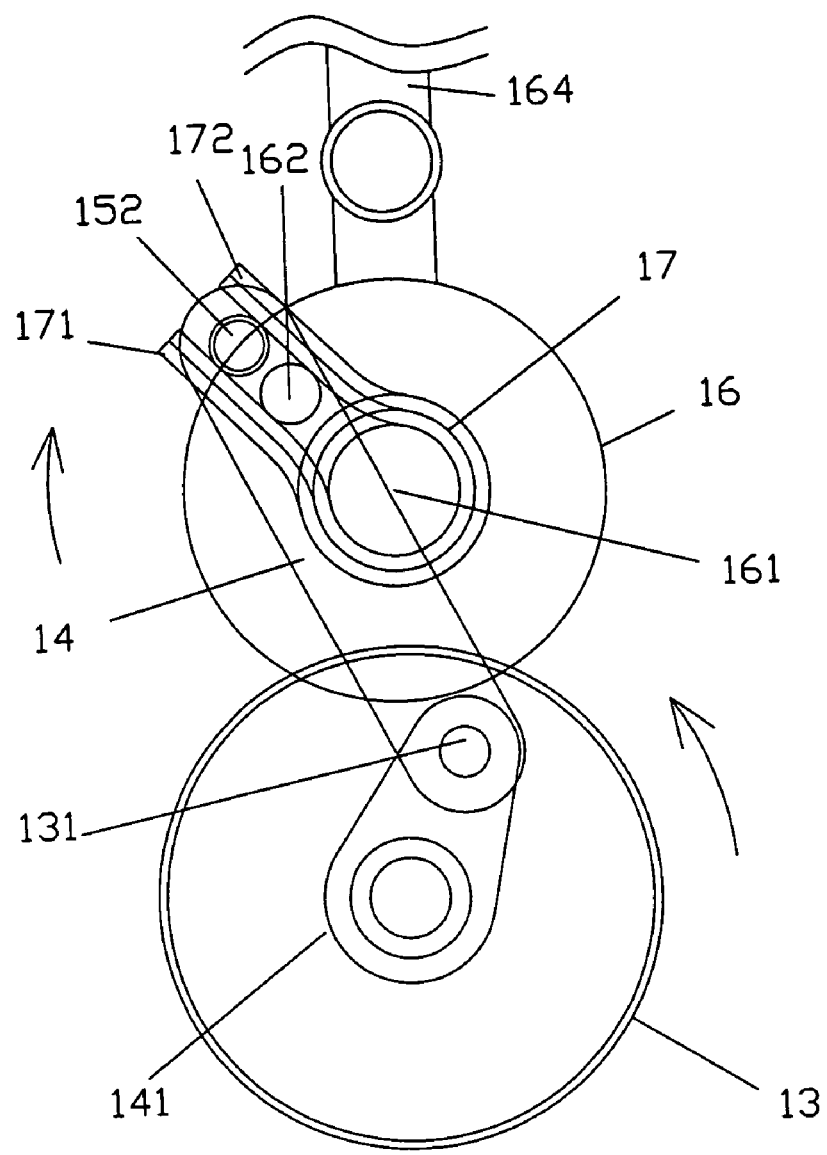
FIG. 11 is a view similar to FIG. 10, wherein the actuating wheel turns in a reverse direction to the forward gear position.

When the transmission gear 13 further turns and moves the connecting rod 14 counterclockwise to a position shown in FIGS. 10 and 11, the actuating rod 164 returns to the positioning section "B" as a result of clockwise rotation of the actuating wheel 160. Meanwhile, the movable block 4 is in a neutral position not engaging with any one of the first gear 2 and the second gear 3. Thus, the motor 11 and the transmission gear 13 always turn in the same direction for driving the actuating wheel 160 in the clockwise direction or the counterclockwise direction. The operational stability is improved, as reverse rotation of the motor 11 is not required. Further, travel of the movable block 4 can be precisely determined by the connecting rod 14 and the positioning groove 163.

The sensing device 18 may detect position of the sensor 1511 and deactivates the motor 11, thereby stopping the actuating rod 164 in the desired position (forward gear position, neutral position, or reverse gear position). In particular, the sensing device 18 detects an angular position of the eccentric block 15 by means of detecting a position of the sensor 1511 on the eccentric block 15. The sensing device 18 stops the motor 11 based on detected angular position of the eccentric block 15, thereby positioning the movable block 4 in one of the forward driving position, the neutral position, and the rearward driving position.

Figure 12:
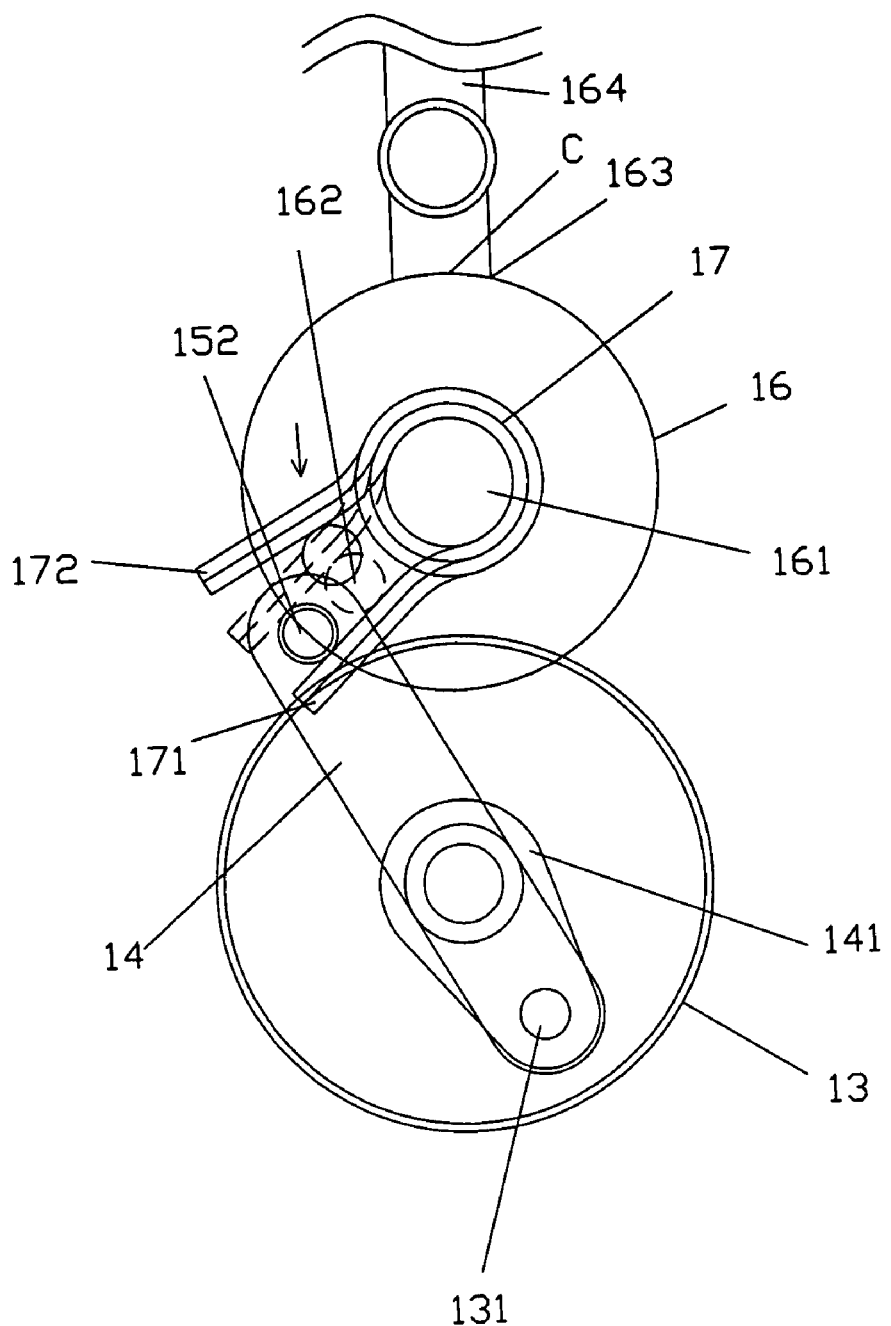
FIG. 12 is a view similar to FIG. 4, illustrating operation of an elastic element for absorbing additional travel of the motor.

Referring to FIG. 12, in a case that the movable block 4 is in one of the forward driving position and the rearward driving position and that the respective protrusion 41 of the movable block 4 is not aligned with the engaging groove 21 of the first gear 2 (or the engaging groove 31 of the second gear 3), the motor 11 still turns 11 so as to move the transmission gear 13 and the eccentric block 13 to a predetermined position, the actuating peg 152 of the eccentric block 15 turns and thus causes displacement of the first end 171 of the elastic element 17. Meanwhile, the movable block 4 turns to urge the respective protrusion 41 of the movable block 4 to be aligned with the engaging groove 21 of the first gear 2 (or the engaging groove 31 of the second gear 3). The second end 172 of the elastic element 17 turns the abutting member 162 and the actuating wheel 16 to a predetermined position under the action of the elasticity of the elastic element 17. Thus, the elastic element 17 absorbs the additional travel of the motor 11, the transmission gear 13, and the eccentric block 15 and thus improves operational stability.

Figure 13:
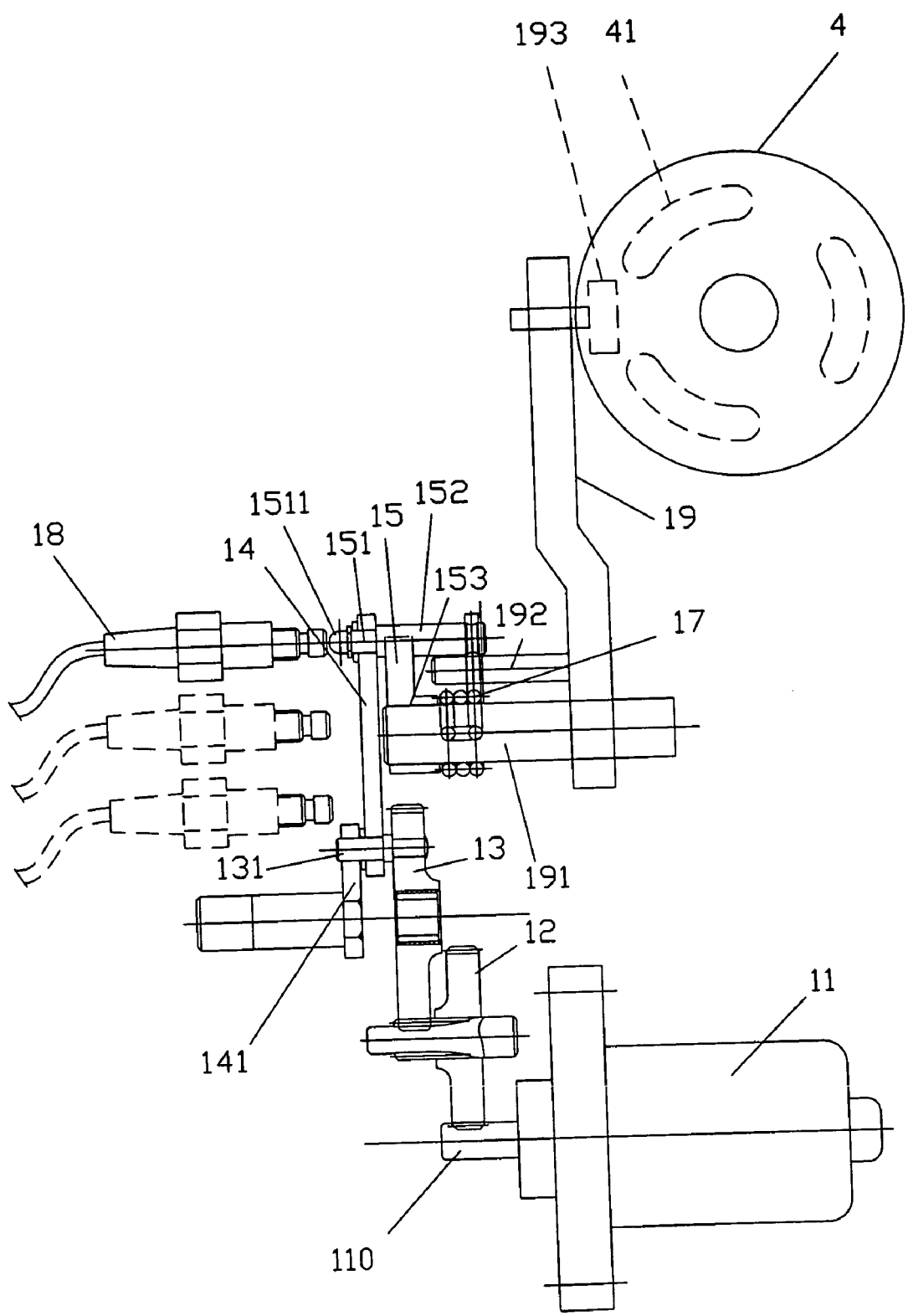
FIG. 13 is a plan view illustrating another embodiment of the present invention.
Figure 14:
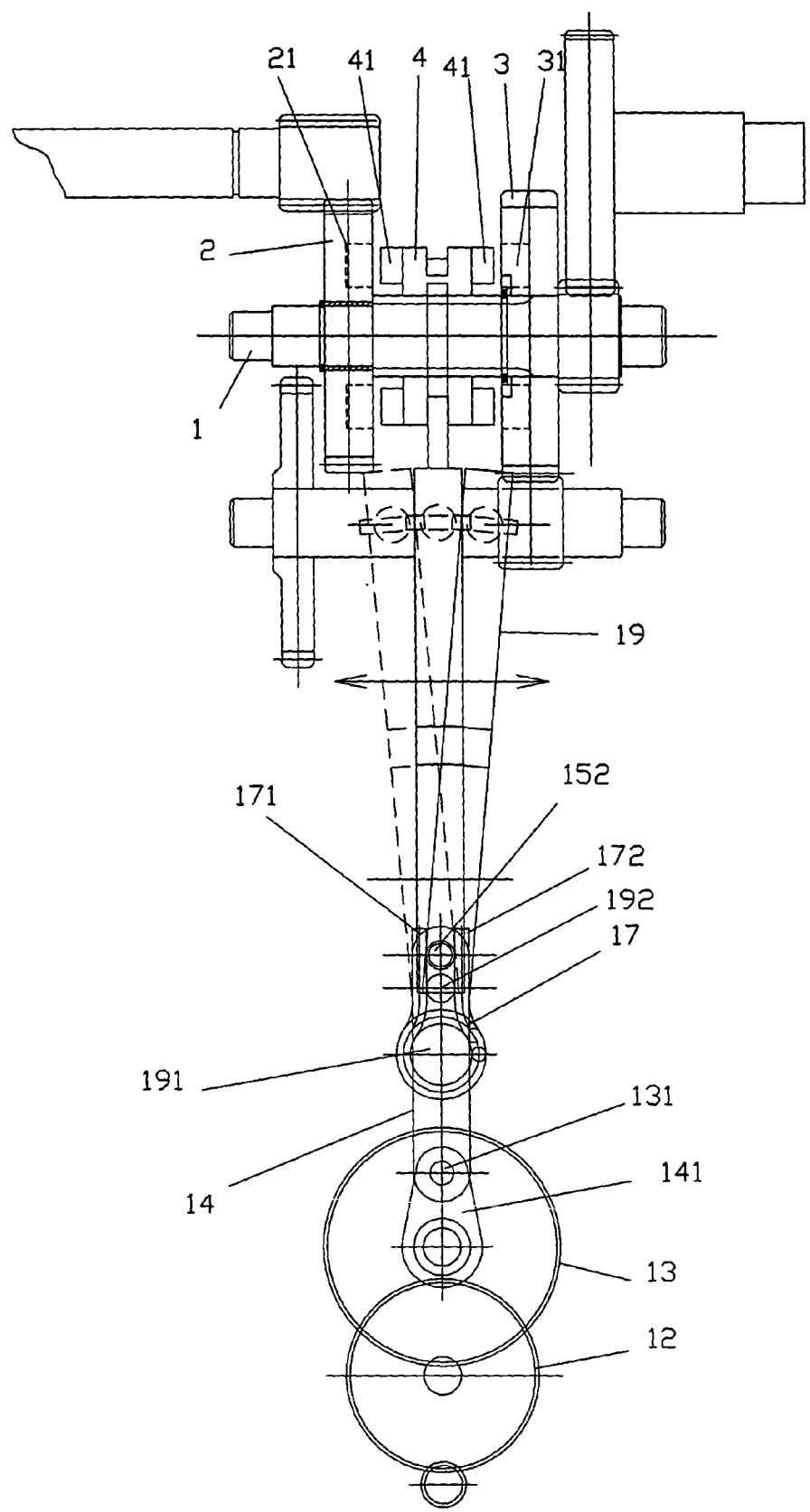
FIG. 14 is a plan view illustrating a further embodiment of the present invention.
Figure 15:
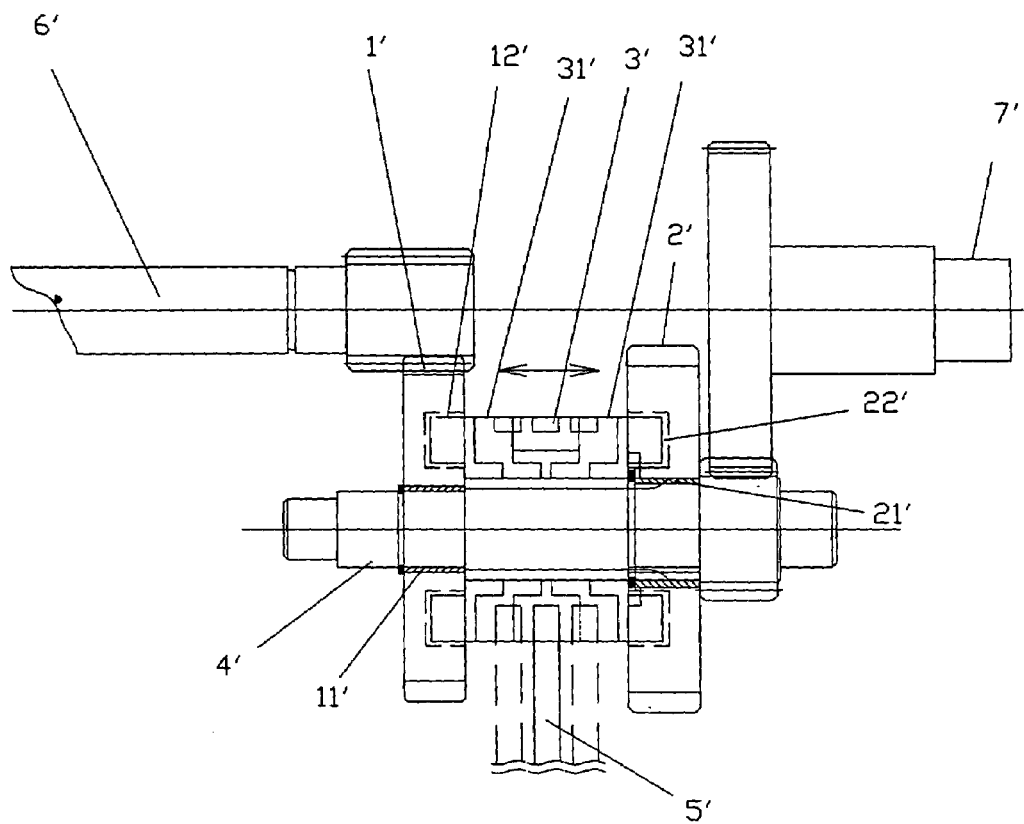
FIG. 15 is a plan view of a conventional motorized vehicle gearbox.
Figure 16:
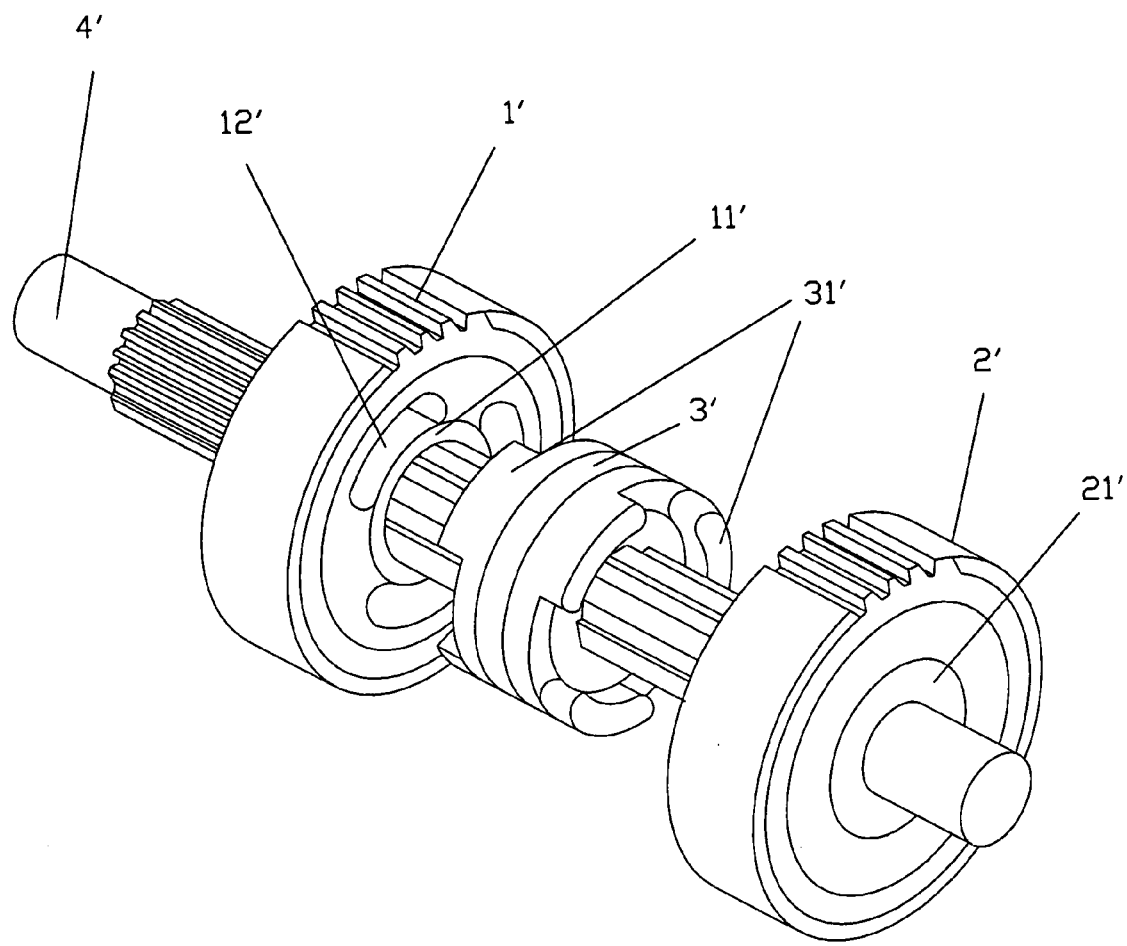
FIG. 16 is a perspective view of main parts of the gearbox in FIG. 15.
Figure 17:
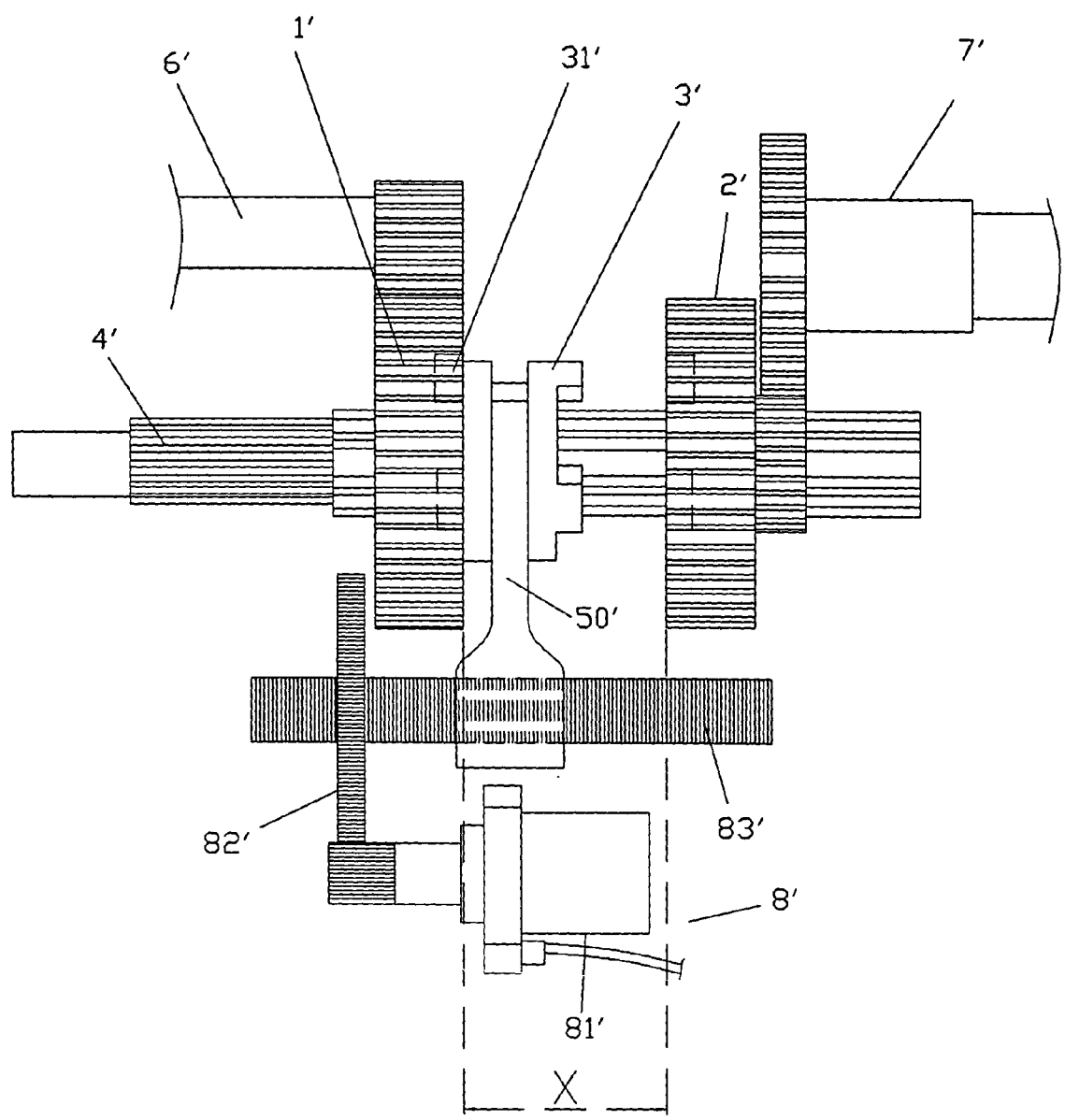
FIG. 17 is a plan view of another conventional motorized vehicle gearbox.
Figure 18:
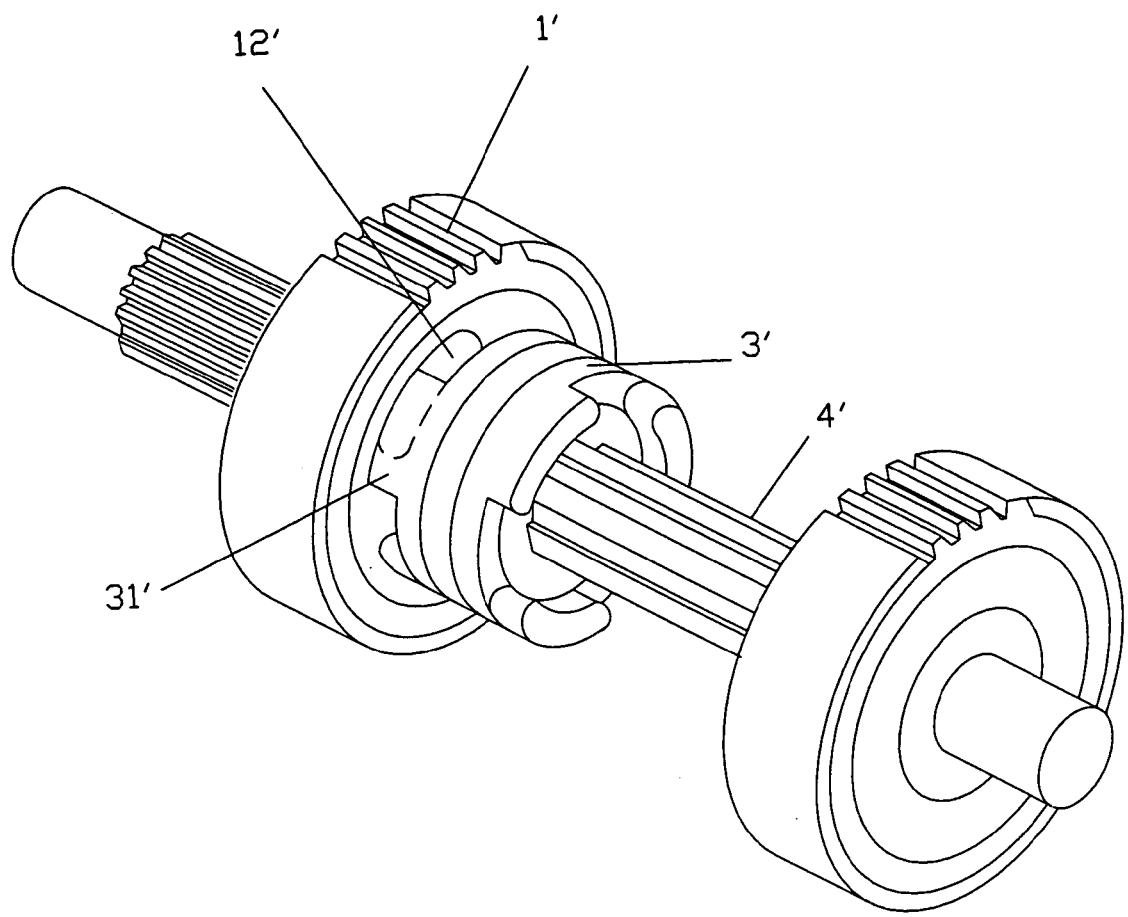
FIG. 18 is a perspective view of main parts of the gearbox in FIG. 17.

FIGS. 13 and 14 illustrate another embodiment of the invention, wherein the actuating device 16 is replaced by another actuating device including a rod 19 having a first end and a second end. An axle 191 (which corresponds to the axle 161 of the first embodiment) and an abutting member 192 (which corresponds to the abutting member 162 of the first embodiment) are formed on the first end of the rod 19. Further, an engaging member 193 is formed on the second end of the rod 19 for securely engaging with the movable block 4. The movable block 4 is moved in a manner substantially the same as that in the first embodiment when the motor 11 turns.

According to the above description, the automatic control device in accordance with the present invention includes the following advantages:

1. The transmission gear 1 and the motor 11 always turn in the same direction to move the movable block 4. Namely, reverse rotation of the motor 11 is not needed, providing smooth operation.

2. The movable block 4 can be reliably retained in one of the forward gear position, neutral position, and reverse gear position.

3. The sensing device 18 and the sensor 1511 precisely stop the motor 11, thereby precisely positioning the movable block 4.

4. The elastic element 17 absorbs additional travel of the motor 11, the transmission gear 13, and the eccentric block 15 resulting in misalignment between the respective protrusion 41 of the movable block 4 and the respective engaging groove 21, 31. The operational stability is thus improved.

Although the invention has been explained in relation to its preferred embodiments, it is to be understood that many other possible modifications and variations can be made without departing from the scope of the invention as hereinafter claimed.

What is claimed is:

1. An automatic control device for a gearbox of a motorized vehicle, the motorized vehicle gearbox including a movable block movable between a forward driving position for driving the motorized vehicle forward, a neutral position, and a reverse driving position for driving the motorized vehicle rearward, the automatic control device comprising:
   a motor;
   a transmission gear driven by the motor, the transmission gear including an eccentric axle provided thereon;
   a connecting rod having a first end rotatably connected to the eccentric axle and a second end;
   an eccentric block including a first end rotatably connected to the second end of the connecting rod and a second end; and
   an actuating device including a first end securely connected to the second end of the eccentric block and a second end securely engaged with the movable block to move therewith;
   wherein when the motor is activated, the transmission gear is driven to move the movable block via transmission by the eccentric axle, the connecting rod, the eccentric block, and the actuating device, thereby moving the movable block to one of the forward driving position, the neutral position, and the rearward driving position.

2. The automatic control device as claimed in claim 1, wherein the actuating device includes an actuating wheel having a longitudinal axle extending therefrom, the longitudinal axle of the actuating wheel being securely connected to the second end of the eccentric block, a positioning groove being defined in a periphery of the actuating wheel and including three positioning sections respectively corresponding to the forward driving position, the neutral position, and the rearward driving position of the movable block, an actuating rod including a first end slidably guided in the positioning groove and movable between the three positioning sections, the actuating rod further including a second end connected to the movable block to move therewith.

3. The automatic control device as claimed in claim 2, wherein the gearbox includes a transmission shaft, a first gear mounted on the transmission shaft for forward driving, a second gear mounted on the transmission shaft for rearward driving, the movable block being mounted on the transmission shaft to move therewith, the movable block being slidable along a longitudinal direction of the transmission shaft, the movable block including two protrusions respectively on two sides thereof for respectively and releasably engaging with one of an engaging groove defined in a side of the first gear and an engaging groove defined in a side of the second gear, thereby driving the motorized vehicle forward or backward.

4. The automatic control device as claimed in claim 3, wherein the first end of the eccentric block further includes an actuating peg formed thereon, the actuating wheel including an abutting member formed on an end face thereof, further including an elastic element mounted around the longitudinal axle of the actuating wheel and including a first end abutting against the actuating peg of the eccentric block and a second end abutting against the abutting member.

5. The automatic control device as claimed in claim 4, wherein when the movable block is in one of the forward driving position and the rearward driving position and when a respective protrusion of the movable block is not aligned with an associated one of the engaging grooves, the motor turns further to move the transmission gear and the eccentric block to a predetermined position, the actuating peg of the eccentric block turns and thus causes displacement of the first end of the elastic element, the movable block turns to urge the respective protrusion of the movable block to be aligned with the associated one of the engaging grooves, the second end of the elastic element turns the abutting member and the actuating wheel to a predetermined position under the action of the elasticity of the elastic element, thereby absorbing additional travel of the motor, the transmission gear, and the eccentric block.

6. The automatic control device as claimed in claim 1, wherein the actuating device includes a rod having a first end and a second end, an axle being formed on the first end of the rod and securely connected to the second end of the eccentric block, the second end of the rod being connected to the movable block to move therewith.

7. The automatic control device as claimed in claim 6, wherein the gearbox includes a transmission shaft, a first gear mounted on the transmission shaft for forward driving, a second gear mounted on the transmission shaft for rearward driving, the movable block being mounted on the transmission shaft to move therewith, the movable block being slidable along a longitudinal direction of the transmission shaft, the movable block including two protrusions respectively on two sides thereof for respectively and releasably engaging with one of an engaging groove defined in a side of the first gear and an engaging groove defined in a side of the second gear, thereby driving the motorized vehicle forward or backward.

8. The automatic control device as claimed in claim 7, wherein the first end of the eccentric block further includes an actuating peg formed thereon, the first end of the rod including an abutting member formed thereon, further including an elastic element mounted around the axle, the elastic element including a first end abutting against the actuating peg of the eccentric block and a second end abutting against the abutting member.

9. The automatic control device as claimed in claim 1, further including a sensor mounted on the eccentric block and a sensing device for detecting an angular position of the eccentric block by means of detecting a position of the sensor, the sensing device stopping the motor based on detected angular position of the eccentric block, thereby positioning the movable block in one of the forward driving position, the neutral position, and the rearward driving position.

10. The automatic control device as claimed in claim 2, further including a sensor mounted on the eccentric block and a sensing device for detecting an angular position of the eccentric block by means of detecting a position of the sensor, the sensing device stopping the motor based on detected angular position of the eccentric block, thereby positioning the movable block in one of the forward driving position, the neutral position, and the rearward driving position.

11. The automatic control device as claimed in claim 3, further including a sensor mounted on the eccentric block and a sensing device for detecting an angular position of the eccentric block by means of detecting a position of the sensor, the sensing device stopping the motor based on detected angular position of the eccentric block, thereby positioning the movable block in one of the forward driving position, the neutral position, and the rearward driving position.

12. The automatic control device as claimed in claim 4, further including a sensor mounted on the eccentric block and a sensing device for detecting an angular position of the eccentric block by means of detecting a position of the sensor, the sensing device stopping the motor based on detected angular position of the eccentric block, thereby positioning the movable block in one of the forward driving position, the neutral position, and the rearward driving position.

13. The automatic control device as claimed in claim 5, further including a sensor mounted on the eccentric block and a sensing device for detecting an angular position of the eccentric block, the sensing device stopping the motor based on detected angular position of the eccentric block, thereby positioning the movable block in one of the forward driving position, the neutral position, and the rearward driving position.

14. The automatic control device as claimed in claim 6, further including a sensor mounted on the eccentric block and a sensing device for detecting an angular position of the eccentric block by means of detecting a position of the sensor, the sensing device stopping the motor based on detected angular position of the eccentric block, thereby positioning the movable block in one of the forward driving position, the neutral position, and the rearward driving position.

15. The automatic control device as claimed in claim 7, further including a sensor mounted on the eccentric block and a sensing device for detecting an angular position of the eccentric block by means of detecting a position of the sensor, the sensing device stopping the motor based on detected angular position of the eccentric block, thereby positioning the movable block in one of the forward driving position, the neutral position, and the rearward driving position.

16. The automatic control device as claimed in claim 1, further including a reduction gear mounted between the motor and the transmission gear.

17. The automatic control device as claimed in claim 1, wherein the motor turns in the same direction to switch the movable block between the forward driving position, the neutral position, and the rearward driving position.

18. The automatic control device as claimed in claim 17, wherein the transmission gear turns in the same direction to switch the movable block between the forward driving position, the neutral position, and the rearward driving position.

19. The automatic control device as claimed in claim 2, wherein the motor turns in the same direction to drive the actuating wheel in a first direction and then in a second direction opposite to the first direction.

20. The automatic control device as claimed in claim 6, wherein the motor turns in the same direction to drive the rod in a first direction and then in a second direction opposite to the first direction.

* * * * *